Patented May 21, 1929.

1,713,680

UNITED STATES PATENT OFFICE.

BERTHOLD STEIN, WILLY TRAUTNER, AND ROBERT BERLINER, OF ELBERFELD, GERMANY, ASSIGNORS TO GRASSELLI DYESTUFF CORPORATION, OF NEW YORK, N. Y., A CORPORATION OF DELAWARE.

GREEN VAT DYESTUFFS AND PROCESS OF MAKING THE SAME.

No Drawing. Application filed September 16, 1926, Serial No. 135,987, and in Germany October 20, 1925.

We have shown in our co-pending application Serial No. 135,986 filed on even date, that by treating 1-phenyl-benzanthrone with anhydrous aluminium chloride at temperatures of about 100 to 150° C. a new isomeric phenyl-benzanthrone compound is formed, being most probably 10-phenyl-benzanthrone of the formula:

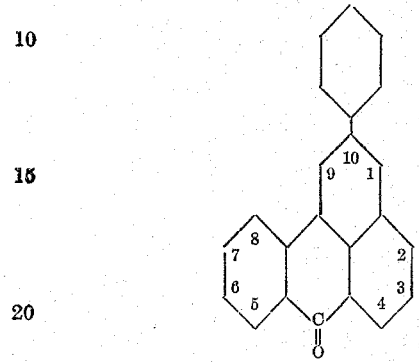

It forms yellow, crystalline needles, melting at 199–200° C. and dissolves in concentrated sulfuric acid with a yellowish-red color.

We have now found that by submitting this 10-phenyl-benzanthrone to an alkali fusion a vat dyestuff is obtained from which cotton is dyed clear bluish-green shades of excellent fastness properties.

The alkali fusion can be effected by means of alkali metal hydroxides or compounds having a similar action such as sodium amid, potassium-anilid etc., it also can be effected in the presence of a solvent such as alcohol, phenol or even with water solutions of the alkali metal hydroxides. The reaction leads primarily to the formation of a leuco compound from which the dyestuff is obtained by oxidation, as for instance the action of atmospheric oxygen.

The novel vat dyestuff is obtained as a green floccular product which dissolves in concentrated sulfuric acid with a deep red color.

It constitutes most probably 10—10'-diphenylviolanthrone of the formula:

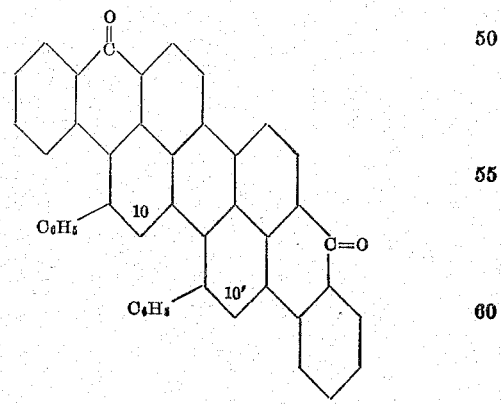

The following examples will further illustrate our invention, the parts being by weight.

*Example 1.*—15 parts potassium hydroxide are added to a suspension of 1 part 10-phenyl-benzanthrone in 20 parts alcohol and heated to 150° C., whereby the excess alcohol distills off. The melt darkens and is finished after about one and one-half hours heating. It is diluted with water, and in order to oxidize the primarily formed leuco compound is boiled up, and filtered. The novel dyestuff is obtained as green floccules, which dissolve in concentrated sulfuric acid with a deep red color. It forms a blue vat from which cotton is dyed clear bluish-green shades of excellent fastness properties.

*Example 2.*—1 part 10-phenyl-benzanthrone is dissolved in 8 parts phenol and 10 parts potassium hydroxide added, the melt is then heated with stirring to 190–200° C., when the reaction proceeds rapidly. The melt is then worked up as in Example 1. The product so obtained is identical with that of Example 1.

We claim:

1. The process which comprises submitting a 10-phenylbenzanthrone to an alkali fusion.

2. The process which comprises submitting 10-phenylbenzanthrone to the action of an alkali metal hydroxide at a temperature of about 150 to 200° C. and oxidizing the primarily formed leuco compound.

3. As a new product 10—10'-diphenylviolanthrone forming a green vat dyestuff which dissolves in concentrated sulfuric acid with a deep red color and forms a blue vat from which cotton is dyed bluish-green shades of excellent fastness properties.

In testimony whereof we have hereunto set our hands.

BERTHOLD STEIN.
WILLY TRAUTNER.
ROBERT BERLINER.

Certificate of Correction.

Patent No. 1,713,680. Granted May 21, 1929, to

BERTHOLD STEIN ET AL.

It is hereby certified that error appears in the printed specification of the above numbered patent requiring correction as follows: Page 1, lines 50 to 60, strike out the formula and insert instead the formula as shown below

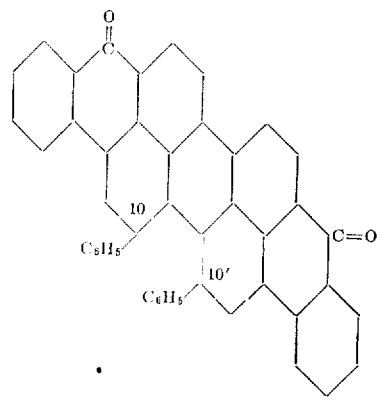

and that the said Letters Patent should be read with this correction therein that the same may conform to the record of the case in the Patent Office.

Signed and sealed this 13th day of August, A. D. 1929.

M. J. MOORE,
Acting Commissioner of Patents.

[SEAL]